Patented Nov. 16, 1926.

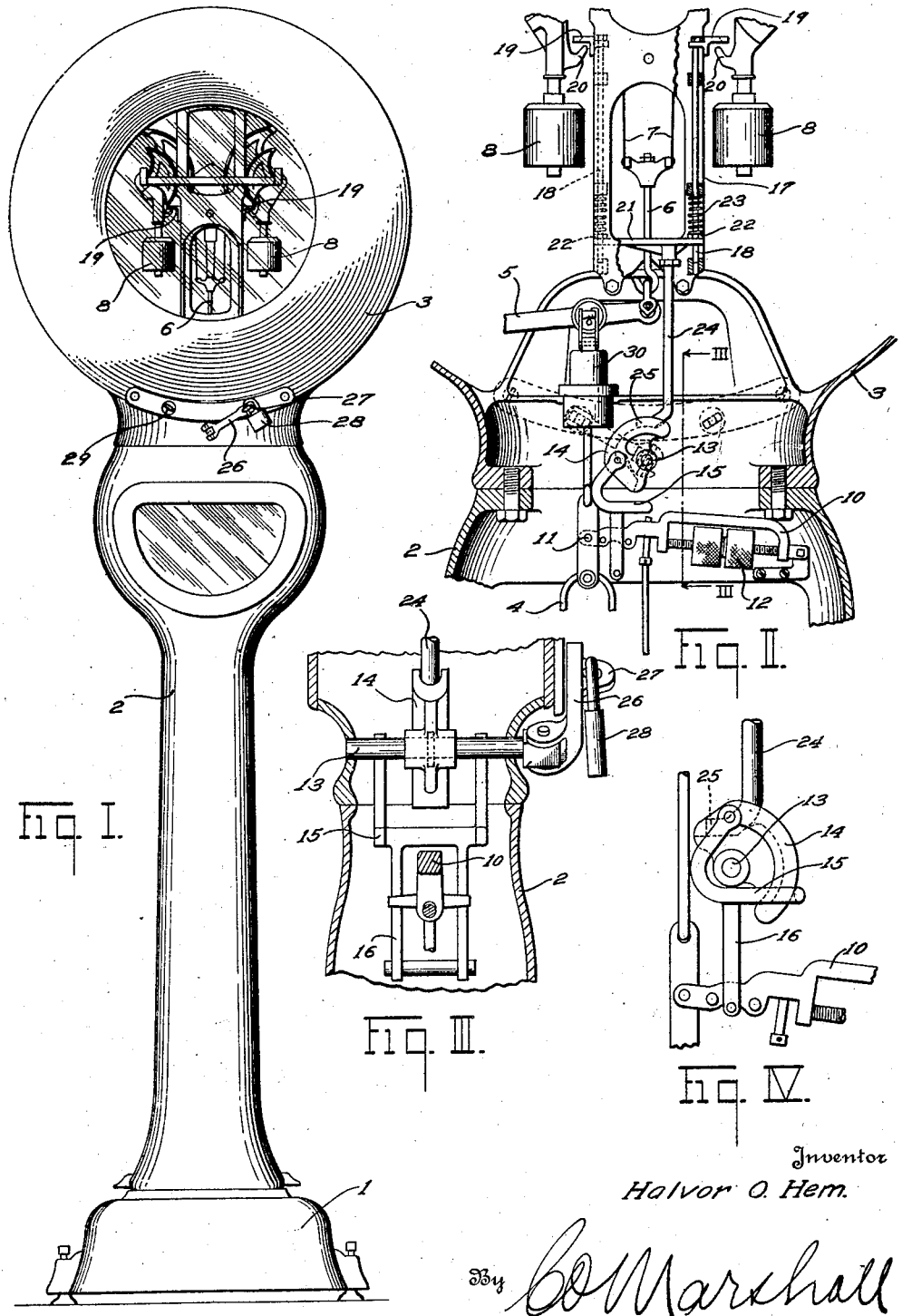

1,606,938

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed June 23, 1923. Serial No. 647,232.

This invention relates to weighing scales of the platform type, in which the load is counterbalanced by automatically acting pendulums, and particularly to so-called person weighers, and one of its principal objects is the provision of reliable fool-proof locking means for preventing the mechanism from flopping about when the scale is moved from place to place.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a rear elevational view of a scale embodying my invention;

Figure II is an enlarged fragmentary sectional view showing my locking means;

Figure III is a further enlarged sectional view taken on the line III—III of Figure II; and Figure IV is a fragmentary side elevation showing some of the parts illustrated in Figure III.

Referring to the drawings in detail, the scale to which I have shown my device applied is of a well-known type having a base 1 containing platform levers (not shown), a column 2 being supported at the rear end of the base, a watch-case-shaped head 3 surmounting the column 2. Suitable link connections 4 extend upwardly through the column 2 to a lever 5 located within the head 3, an oil seal 30 surrounding the connections 4 where they pass into the head 3 to prevent the entrance of dust and other injurious matter into the head.

The lever 5 is connected, by means of a link 6 and flexible metallic ribbons 7, to the automatic load-counterbalancing mechanism of the scale, which consists of a pair of outwardly swingable pendulums 8. The mechanism so far described is substantially that shown in my co-pending application, Ser. No. 433,919, filed December 29, 1920, and I will not, therefore, again describe it in detail.

Person weighing scales of this type are frequently set outside of mercantile establishments during the day and taken in at night, and the delicate load-counterbalancing and indicating mechanism is liable to derangement as the scale is moved over doorsills, steps and other obstructions. It is with the object of preventing such injury by locking the pendulums securely against movement and relieving the delicate mechanism from shocks and strains during movement of the scale and also for the purpose of providing a device for locking the scale when it is left in a place where it might be subject to mischievous or malicious vandalism that I have provided the improvements now to be described.

Pivotally supported within the column 2 is a short arm or lever 10, one end of which is pivotally connected, as at 11, to the link connections 4. The lever 10 may, if desired, carry movable balancing weights 12 which may be shifted to increase or decrease the initial pull on the automatic load-counterbalancing mechanism. Journaled in the lower end of the head 3 is a shaft 13, and fixed to the shaft 13 is a grooved cam-like member 14. A link-like member 15, at the lower end of which is a stirrup 16 surrounding the lever 10, is pivotally connected to the cam-like member 14, the parts being so proportioned and arranged that when the shaft 13 is rocked to move the cam-like member 14 from the position in which it is shown in Figure II to the position in which it is shown in Figure IV, the stirrup 16 will be drawn upwardly into engagement with the lower side of the lever 10 and the link connections 4 will be lifted so that the platform levers and platform are supported by the lever 10 and the load-counterbalancing and indicating mechanism in the head 3 will be unaffected by such shocks as may be caused by persons jumping upon the platform or by movement of the platform and levers as the scale is shifted about. The link-like member 15 is so shaped that it will hang vertically without interference with the cam-like member 14 or with other parts of the mechanism as the shaft 13 is rocked from one position to another.

Slidably mounted on the framework 17 which supports the load-counterbalancing pendulums 8 is a pair of rods 18. To the upper end of each of the rods 18 is fixed a lug 19 having an opening adapted, when the rod 18 is moved downwardly, to engage a hook 20 which is formed upon the pendulum 8. The lower ends of the rods 18 pass loosely through a cross-head 21, and a nut 22 is fixed upon each of the rods 18 immediately above the cross-head 21, so that as the cross-head moves upwardly it comes into engagement with the nuts 22 and the rods 18 are thereby forced upwardly so that the lugs 19 are disengaged from the hooks 20. Springs 23 located between the nuts 22 and guiding lugs on the frame 17 urge the rods 18 downwardly.

Rigidly attached to the crosshead 21 and extending downwardly therefrom is a bar 24 upon the lower end of which is formed a foot 25 that rests in the groove in the cam-like member 14, the bottom of the groove being so shaped that when the cam-like member is turned to the position in which it is shown in Figure II (and the link-like member 15 is thereby lowered out of engagement with the lever 10) the foot 25 and rod 24 are lifted so that the crosshead 21 is raised, the rods 18 forced upwardly, and the lugs 19 thus moved out of engagement with the hooks 20 on the pendulums 8.

When the cam-like member 14 is turned to the position in which it is shown in Figure IV, the foot 25 sinks into a depression and the rods 18 are, therefore, forced downwardly by the springs 23 so that the lugs 19 are brought into engagement with the hooks 20. With the locking device in this position, the stirrup 16 lifts the lever 10 and shocks to the platform lever mechanism are thus prevented from being transmitted to the automatic load-counterbalancing and indicating mechanism.

Pivotally connected to the rear end of the shaft 13 which extends exteriorly of the head 3 is an arm 26 which serves as a handle by means of which the locking mechanism may be manipulated. The free end of the arms 26 is slotted so that it may pass over a loop 27 adapted to receive a padlock 28 so that the locking mechanism may be secured in unlocked position. When the locking mechanism has been turned to locked position the slot in the arm 26 may be passed over a similar loop 29 and the padlock 28 employed to secure the locking mechanism in locked position. The arm 26 thus serves as a hasp as well as a handle.

The embodiment of my invention herein shown and described is to be regarded as illustrative only, and it is to be be understood that the invention is susceptible to variation, modification and change within the spirit and scope of the subjoined claims.

Having described my invention, I claim:—

1. In a device of the class described, in combination, pendulum load-counterbalancing mechanism, linkage connected to said pendulum load-counterbalancing mechanism, a lever connected to said linkage, a stirrup surrounding said lever, locking means for said pendulums, and means for simultaneously operating said locking means and elevating said stirrup into lifting engagement with said lever.

2. In a device of the class described, in combination, pendulum load-counterbalancing mechanism, linkage connected to said pendulum load-counterbalancing mechanism, a lever connected to said linkage, a stirrup surrounding said lever, locking means for said pendulums, means for simultaneously operating said locking means and elevating said stirrup into lifting engagement with said lever, a handle connected to said means for operating said locking means and elevating said stirrup, and means for securing said handle in locked or unlocked position.

3. In a device of the class described, in combination, pendulum load-counterbalancing mechanism, linkage connected to said load-counterbalancing mechanism, a lever connected to said linkage, a stirrup surrounding said lever, means for elevating said stirrup into lifting engagement with said lever, a handle for said elevating means, and means for securing said handle in locked or unlocked position.

4. In a device of the class described, in combination, pendulum load-counterbalancing mechanism, linkage connected to said load-counterbalancing mechanism, a lever connected to said linkage, a stirrup surrounding said lever, means for elevating said stirrup into lifting engagement with said lever, and a handle for said elevating means, said handle being slotted and adapted to function as a hasp whereby said stirrup may be locked in lifting engagement with said lever.

HALVOR O. HEM.